Oct. 2, 1934.        H. B. HASS ET AL        1,975,456
PROCESS OF PRODUCING OLEFINE HYDROCARBONS AND DERIVATIVES THEREOF
Filed Jan. 8, 1932
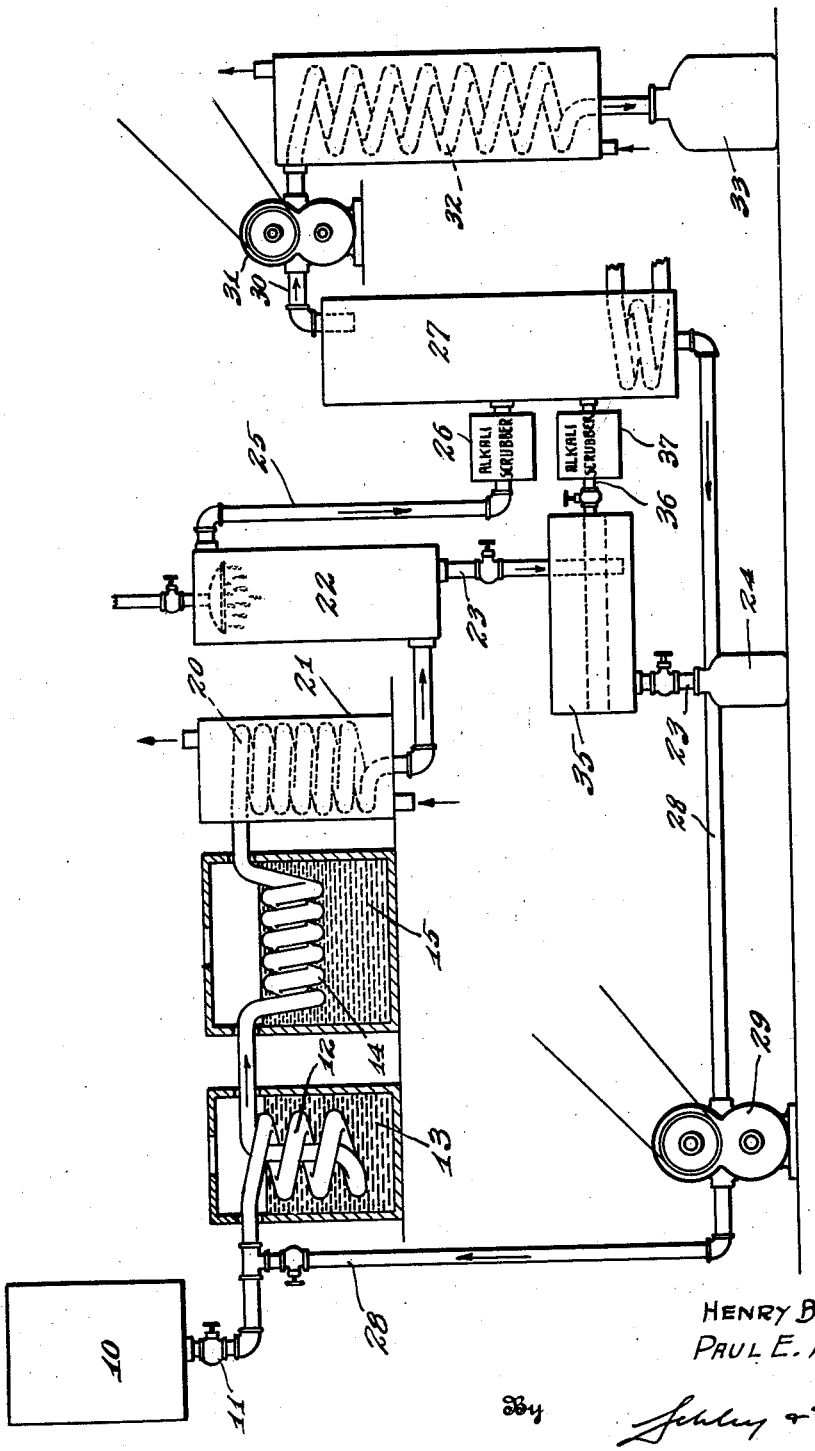
Inventors
HENRY B. HASS AND
PAUL E. WESTON,
By
Attorneys

Patented Oct. 2, 1934

1,975,456

UNITED STATES PATENT OFFICE 1,975,456

PROCESS OF PRODUCING OLEFINE HYDRO-
CARBONS AND DERIVATIVES THEREOF

Henry B. Hass and Paul E. Weston, West
Lafayette, Ind., assignors to Purdue Research
Foundation, West Lafayette, Ind., a corpora-
tion of Indiana Application January 8, 1932, Serial No. 585,548

10 Claims. (Cl. 260—170)

It is the object of our present invention to produce straight-chain olefines of from 4 to 5 carbon atoms economically and substantially free from the impurities which are formed in hitherto known commercial processes of olefine production; so that the comparatively pure olefines thus obtained may be used directly for the manufacture of high-grade alcohols, esters, glycols, and other products. By "straight-chain" we mean that the chain of carbon atoms is unbranched; as distinguished from the iso or other branched-chain compounds, in which there is a branching in the chain of carbon atoms.

Our process may produce various isomers; but that is often immaterial, as the derivatives which may be obtained from the various isomers are oftentimes the same—such for instance as secondary butyl alcohol, which is obtainable either from 1-butene or from 2-butene or from a mixture of 1-butene and 2-butene. The production or non-production of isomers is at least largely controllable, as catalysts are or are not used.

In carrying out our invention, we subject straight-chain alkyl halides of the middle halogens—that is, alkyl chlorides or alkyl bromides—of from 4 to 5 carbon atoms to pyrolysis at high temperatures, above 450° C. and desirably between 500° and 650° C. if no catalyst is used, but somewhat lower than that if a catalyst is used. This causes splitting of the molecule to produce a straight-chain olefine and a hydrogen halide. We then quickly cool the resultant mixture, to minimize the reversal of the reaction and the formation of decomposition products such as occurs on slow cooling. The hydrogen halide obtained is separated, and is a valuable by-product which in itself is often of sufficient value to cover the cost of the initial reagents used. Then the olefines obtained are suitably separated from the unreacted alkyl halides, and the latter may be re-cycled.

In the drawing we show an apparatus suitable for carrying out our process, although other apparatus may be used. In such drawing, the single figure is a diagrammatic view showing such apparatus.

We will describe this apparatus primarily in connection with the obtaining of butenes.

The desired paraffin hydrocarbon—butane or pentane—may be halogenated in any desired manner, with either middle halogen. We desirably use chlorine as the halogen, although we may use bromine. If butane is the starting hydrocarbon, it may be chlorinated in any known manner, to form chlorobutanes. We use monochlorobutanes, desirably substantially free from any polychlorobutanes; for it is possible in chlorinating butane to get a yield of monochlorobutane as high as 90% or 95%.

The reaction in chlorinating butane may be as shown in either of the following equations:

(1) 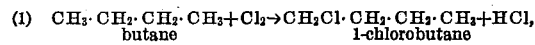
butane               1-chlorobutane or (2) 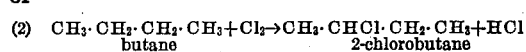
butane            2-chlorobutane Usually there is a mixture formed consisting in part of 1-chlorobutane shown as a result of Equation (1) and 2-chlorobutane shown as a result of Equation (2). These chlorobutanes are liquid at room temperature.

Either of these monochlorobutanes, or a mixture of them, may be placed in a container 10, and fed thence, under the control of a valve 11, to a preheating tube 12 in which vaporization occurs. The tube 12 may be maintained at a temperature somewhat above the boiling points of the monochlorobutanes, (which are respectively about 78° C. and 68° C.,) and conveniently at about 300° C., as by being immersed in a bath 13 of molten salts held at the desired temperature.

From the tube 12, the vaporized monochlorobutanes pass to and through a reaction tube 14. This tube is maintained at such temperature that pyrolysis quickly occurs therein; and is of such length that the reaction time is sufficiently long to produce at least 80% yield of butenes but desirably sufficiently short to prevent material decomposition of the butenes produced. The desirable reaction time decreases as the temperature is increased. We have found that excellent results with a mixture of monochlorobutanes may be obtained by maintaining the temperature of the tube 14 at 600° C.±10°. The flow of vapors through the reaction tube 14 is desirably such that the vapors pass through in less than 3.0 seconds; and desirably in about 1.5 seconds, which gives about 80% yield of very pure butenes. Those conditions vary somewhat for different alkyl halides, but the value given is a desirable one for pyrolyzing monochlorobutanes. The desired temperature of the reaction tube may be obtained by having it immersed in a bath 15 of molten lead, or of suitable molten salts.

In the reaction tube 14 the monochlorobutanes are pyrolyzed to form hydrogen chloride and a mixture of butenes. If no catalyst is present, the reactions are shown by the following equations:

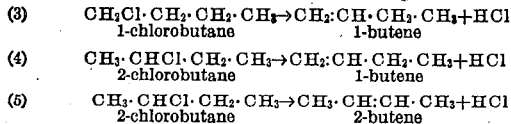

(3) $CH_2Cl \cdot CH_2 \cdot CH_2 \cdot CH_3 \rightarrow CH_2{:}CH \cdot CH_2 \cdot CH_3 + HCl$
　　1-chlorobutane　　　　1-butene (4) $CH_3 \cdot CHCl \cdot CH_2 \cdot CH_3 \rightarrow CH_2{:}CH \cdot CH_2 \cdot CH_3 + HCl$
　　2-chlorobutane　　　　1-butene (5) $CH_3 \cdot CHCl \cdot CH_2 \cdot CH_3 \rightarrow CH_3 \cdot CH{:}CH \cdot CH_3 + HCl$
　　2-chlorobutane　　　　2-butene Thus the 1-chlorobutane on pyrolysis produces 1-butene and hydrogen chloride; while the 2-chlorobutane produces some 1-butene and some 2-butene, in addition to hydrogen chloride. The 2-butene may be either one of two alloisomers—cis-2-butene and trans-2-butene; so that in the process there are three butenes formed simultaneously, in proportions which depend on conditions. We can if necessary separate those three butenes, as by rectification; but ordinarily it is not necessary to separate them.

By using calcium chloride as a catalyst in the pyrolysis, a tendency arises to promote the formation of 2-butene, possibly by a shifting of the double bond as indicated by the following equation:

(6) $CH_2{:}CH \cdot CH_2 \cdot CH_3 \rightarrow CH_3 \cdot CH{:}CH \cdot CH_3$

Thus, when the pyrolysis was made of 1-chlorobutane alone: if without a catalyst, the butene produced was substantially pure 1-butene; while if with $CaCl_2$ as a catalyst, a mixture of about ⅕ 1-butene and ⅘ 2-butene was produced.

Similarly, when the pyrolysis was made of 2-chloro-butane alone: if without a catalyst, a mixture of about ⅔ 1-butene and ⅔ 2-butene was obtained; if with $CaCl_2$ as a catalyst at a reaction temperature of 450° C., a mixture of about 15% 1-butene and 85% 2-butene was obtained; and if with $CaCl_2$ as a catalyst at a reaction temperature of 400° C., a butene which was at least 95% 2-butene was obtained.

The reactions shown in Equations 3, 4, and 5 are reversible, depending on temperature, and tend to go the other way from that indicated if the temperature is lowered slowly. Also, if the gases are maintained at the high reaction temperature for any material length of time following the reaction, there are various side reactions that tend to produce unwanted products.

Therefore, on passing from the discharge end of the reaction tube 14 the mixture of hot gases is immediately cooled. To this end, such mixture is passed directly from such discharge end to a cooling coil 20, in a cooling jacket 21 through which cold brine or water flows; and it is there quickly reduced to room temperature or below, desirably to about 20° C. The cooled gases from the cooling coil 20 pass to a counter-current water-scrubber 22. The water takes up the hydrogen chloride which has been formed, and passes out at the bottom through a valved discharge pipe 23 into a suitable receiver 24. The hydrochloric acid thus obtained is a valuable by-product, and in it practically half of the chlorine used in the original chlorination of the hydrocarbon is recovered. The butenes, and any unreacted monochlorobutanes, pass by a pipe 25 from the top of the water-scrubber 22, desirably through an alkali scrubber 26, to the middle of a continuous rectifying column 27, the temperatures within which are controlled so as to separate the butenes from such unreacted monochlorobutanes. This is readily done, as the butenes boil between $-6.7°$ and $+3.0°$ C., while as already stated the monochlorobutanes have boiling points of about 78° and 68° C. respectively.

The condensed monochlorobutanes pass from the bottom of the rectifying column 27 to a return pipe 28, in which is a pump 29. The pipe 28 leads back to the entrance to the pre-heating tube 12, to re-cycle the unreacted monochlorobutanes. The purified butenes pass from the top of the rectifying column 27 by a pipe 30 to a pump 31, and thence through a condensing coil 32 into a collecting receptacle 33. The pump 31, assisted somewhat by the pump 29, maintains the flow of fluids through the system. The pumps also serve to keep the pressure in the reaction tube 14 at about atmospheric pressure, which we find desirable for the proper reaction for greater pressure retards the reaction, and less pressure tends to admit air with the accompanying danger of explosion.

As we have already stated, instead of using chlorobutanes as our starting alkyl halide, we may use bromine as the halogen and/or the pentyl radicals, to provide various monobromobutanes, monobromopentanes, and monochloropentanes, as the starting alkyl halide. In such cases the pyrolysis in the reaction tube 14 may give hydrobrom acid; as a by-product instead of hydrochloric acid, and the olefines produced will be butenes or pentenes as the case may be.

For instance bromo-pentane (either 1-bromo-pentane, 2-bromo-pentane, 3-bromo-pentane, or a mixture of two or all of these,) may be vaporized, and the vapor passed at a pressure at about atmospheric pressure through the reaction tube 14, while the latter is held at a temperature of 500° C.±10°. The vapor is passed at such a rate that it remains for a suitable time in the reaction tube. The pyrolysis of 1-bromopentane occurs relatively slowly, and if it is used the reaction time at 500° C. is desirably at least 10 to 20 seconds. The pyrolysis of 2-bromopentane and 3-bromopentane occurs relatively rapidly, and if they are used the reaction time at 500° C. is desirably about 1.5 to 2 seconds.

The vapors issuing from the reaction tube 14 are cooled rapidly, to about 40° C., in the cooling coil 20; and the cooled fluid is then passed to the water-scrubber 22, desirably maintained at about the same temperature, in which the water takes up the hydrogen bromide. The pentenes (amylenes) are gaseous at this temperature (40° C.), and pass out through the pipe 25 and the alkali scrubber 26 to the middle of the rectifying column 27. The unreacted bromopentanes are liquid at the temperature of the water-scrubber, so that a portion of them passes from the bottom thereof with the water solution of hydrogen bromide. A container 35 may be provided in the pipe 23 to receive this mixture of liquids, and to hold them with sufficient quiet to let them separate by gravity into two layers, for they are not miscible. The upper layer usually contains the unreacted bromopentanes, and the lower layer the water solution of hydrogen bromide; although it is possible to reverse this order if there is excess water. The two layers are drawn off from the upper and lower levels respectively, of the container 35, the water solution of hydrogen bromide (hydrobromic acid) passing to the receiving container 24, while the bromopentanes pass to an inlet near the bottom of the rectifying column 27 by way of a valved pipe 36 and desirably an alkali scrubber 37. (The valve in the pipe 36 is opened or closed according to whether the unreacted alkyl halides are liquids or vapors at the temperature of the water-scrubber 22.) The rectifying column 27 separates more completely the unreacted bromopentanes from the pentenes; and the former pass back by the pipe 28 and pump 29 for re-cycling, while the latter pass through the pump 31 and cooling coil 32 to the final olefine receiver 33.

No catalyst is necessary with our process, but a catalyst may be used where and if desired. For instance, in producing any of these olefines mentioned, granulated anhydrous calcium chloride may be used in the reaction tube 14. If a catalyst is used, its amount, by weight, is desirably between 50% and 100% of the weight of vapors passed through the reaction tube per hour. The catalyst makes it possible to use lower reaction temperatures. The desirable reaction temperature will vary according to the materials being worked upon, and according to the presence or absence of a catalyst and its nature. Such desirable temperature may in general be stated to be sufficiently high so that at least 80% of the maximum calculated pyrolysis occurs in a few seconds, or at least less than a minute. If the temperature is markedly below such point, the reaction time is materially increased. We have found it desirable to have the reaction temperature above 450° C. if no catalyst is used, and above 200° C. if $CaCl_2$ is used as a catalyst.

Further, the temperature should not be so high that the pyrolysis goes markedly beyond the production of the desired olefines, to produce further split-products; as will be obtained if too high a temperature is used. We find that the maximum desirable temperature is about 700° C. if no catalyst is used, and about 650° C. if $CaCl_2$ is used as a catalyst.

When the pyrolysis above described is carried out a slight carbonaceous deposit sometimes forms very slowly in the reaction tube 14. This is due to a fractional decomposition. It is ordinarily not bothersome in the absence of a catalyst; but in the presence of a catalyst, such deposit gradually reduces the catalytic action. If such a carbonaceous deposit is formed, it can readily be removed by a brief blowing of air through the reaction tube at the same temperature used for the pyrolysis. To avoid explosion, the reaction tube is first blown free of inflammable gas by some inert gas, such as nitrogen or steam or carbon dioxide.

The olefines, such as the butenes, which are obtained in the ultimate receiver 33 may be used in known ways to produce alcohols, esters, glycols, etc. It is often not necessary to separate the isomeric olefines for doing this. For instance, both 1-butene and 2-butene, when hydrated in the presence of sulfuric acid as a catalyst, yield secondary butyl alcohol; so that a substantially pure secondary butyl alcohol may be obtained from either 1-butene or 2-butene, or from a mixture of those butenes.

Although our present invention so far as it is directed to straight-chain the mere production of olefines by pyrolysis of alkyl halides is limited to olefines having from 4 to 5 carbon atoms, it is not thus limited in the separation of the olefines from the co-produced hydrogen halides; for from the viewpoint of separating olefines from hydrogen halides, whether co-produced or not, our invention extends to olefines having from 2 to 7 carbon atoms, such as ethylene, propene, butenes, pentenes, hexenes, and heptenes, from hydrogen chloride or from hydrogen bromide, all of which are producible by pyrolysis in our apparatus of alkyl halides of from 1 to 7 carbon atoms.

We claim as our invention:

1. The process of producing an olefine, which consists in subjecting a straight-chain alkyl halide of from 4 to 5 carbon atoms and of one of the middle halogens to non-catalytic pyrolysis at a temperature above 450° C.

2. The process of producing an olefine in accordance with claim 1, where the alkyl halide is an alkyl chloride.

3. The process of producing an olefine in accordance with claim 1, where the alkyl halide is a monochlorobutane.

4. The process of producing an olefine in accordance with claim 1, where the alkyl halide is a monochloropentane.

5. The process of producing an olefine as set forth in claim 1, and immediately cooling the products of the pyrolysis.

6. The process of producing an olefine, which consists in subjecting a straight-chain alkyl halide of from 4 to 5 carbon atoms and of one of the middle halogens to non-catalytic pyrolysis at a temperature between 450° C. and 700° C.

7. The process of producing an olefine, which consists in subjecting a straight-chain alkyl halide of from 4 to 5 carbon atoms and of one of the middle halogens to non-catalytic pyrolysis at a temperature sufficiently high so that the pyrolysis is 80% complete in less than one minute.

8. The process of producing an olefine, which consists in subjecting a straight-chain alkyl halide of from 4 to 5 carbon atoms and of one of the middle halogens to pyrolysis at a temperature sufficiently high so that the pyrolysis is 80% complete in less than one minute.

9. The process for manufacturing an alcohol, which consists in chlorinating a straight-chain paraffin hydrocarbon having from 4 to 5 carbon atoms to obtain a mixture consisting essentially of straight-chain monochloroparaffins, converting the mixture of straight-chain monochloroparaffins so produced to olefines by non-catalytic pyrolysis, and converting the olefines thus obtained to an alcohol by catalytic hydration.

10. The process for manufacturing an alcohol, which consists in halogenating with a middle halogen a straight-chain paraffin hydrocarbon having from 4 to 5 carbon atoms to obtain a mixture consisting essentially of straight-chain monohalogenated paraffins, converting the mixture of straight-chain monohalogenated paraffins so produced to olefines by non-catalytic pyrolysis, and converting the olefines thus obtained to an alcohol by catalytic hydration.

HENRY B. HASS.
PAUL E. WESTON.

CERTIFICATE OF CORRECTION.

Patent No. 1,975,456.                                October 2, 1934.

HENRY B, HASS, ET AL.

It is hereby certified that error appears in the printed specification of the above numbered patent requiring correction as follows: Page 2, line 91, after the word "reaction" insert a semicolon; and line 102, for "hydrobrom" read hydrobromic; and page 3, line 64, strike out the words "straight-chain" and insert the same after "to" in line 65; and that the said Letters Patent should be read with these corrections therein that the same may conform to the record of the case in the Patent Office.

Signed and sealed this 19th day of February, A. D. 1935.

Leslie Frazer (Seal)                               Acting Commissioner of Patents.